T. O. POTTER,

Assignor to A. NICHOLS.

Suspenders.

No. 8,820. Reissued July 22, 1879.

Witnesses:

P. Dieterich

Chas. G. Page

Thos. O. Potter Inventor

Per Geo. W. Sutro Attorney

UNITED STATES PATENT OFFICE.

THOMAS O. POTTER, OF BOSTON, ASSIGNOR TO ALBERT NICHOLS, OF READING, MASSACHUSETTS.

IMPROVEMENT IN SUSPENDERS.

Specification forming part of Letters Patent No. 194,616, dated August 28, 1877; Reissue No. 8,820, dated July 22, 1879; application filed May 19, 1879.

*To all whom it may concern:*

Be it known that I, THOMAS O. POTTER, of Boston, in the county of Suffolk and State of Massachusetts, have invented a new Shoulder-Brace and Suspender, of which the following is a full, clear, and exact description, reference being had to the accompanying drawings, making part of the same.

Figure 1:
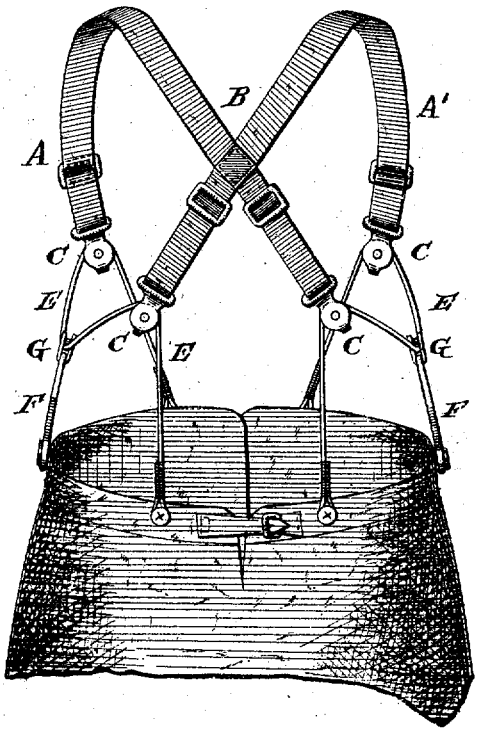
Figure 2:
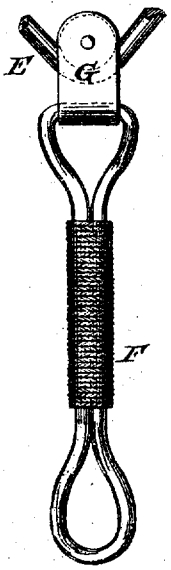
Figure 3:
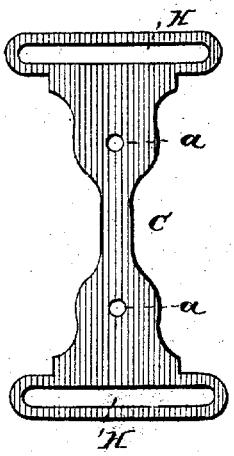
Figure 4:
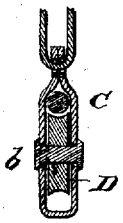

In the drawings, Figure 1 shows, in perspective, a pair of suspenders or braces embodying the features of my invention. Fig. 2 is a detail plan view of one of the intermediate button-hole loops. Fig. 3 is a plan view of the metallic blank, which, when bent into shape, forms the housing for the pulleys which are secured to the ends of the webbing or straps; and Fig. 4 is a central section of the housing, pulley, and the end of the strap or webbing.

Similar letters denote like parts in the several figures.

The main feature of my invention consists in providing the ends of the webs or straps with pulleys secured in position by metallic housings, and combining therewith two independent cords provided at either end with button-holes.

My invention further consists in combining with the straps and independent cords, attached as described, an intermediate button-hole and pulley, as will be hereinafter more fully set forth.

My invention further consists in the novel construction of the metallic housing for the pulleys, whereby the pulleys are secured in position, and the housing adapted to be attached to the web, so as to be kept in proper position by the same.

My invention further consists in forming the button-holes by turning the end of the cord back upon itself to form a loop, and securing the same in position by a splice or metallic clasp, as will be hereinafter more fully set forth.

In order that those skilled may fully understand how to make and use my invention, I will proceed to describe the same, referring by letters to the accompanying drawings.

A A′ are the main straps, crossed and connected at B in any well-known way. Adjustably secured to the ends of these straps are metallic housings C, (shown at Fig. 4 more perfectly,) in which are secured pulleys D, which are free to turn on their axes, as will be presently explained. E E are two cords, the ends of which are formed into button-holes by returning the cord upon itself, and securing it by a splice or metallic clasp. These two cords are passed over the pulleys at the ends of the webs, as clearly shown at Fig. 1, and are free to render through said pulleys.

F F are two intermediate button-holes, formed by passing the cord through a metallic housing, G, (see Fig. 2,) and securing the two ends against the body, as clearly shown. The housing G is provided with a pulley, under which the cords E E may pass when it is desirable to secure the button-holes F in position (shown at Fig. 1) to connect with the side buttons on the trousers.

The metallic housings C are struck out of sheet metal, forming a loop, H, at each end, and perforated at *a a* to form bearings for the axes of the pulleys. The blank C is bent at its center, so that the two loops H will come together and coincide, the balance of the blank spreading, so as to receive the pulley, which is secured so as to be capable of rotation by a shaft or eyelet bearing, *b*. (See Fig. 4.) When the loops H are brought together, so as to form practically a single loop, and the main straps A A′ passed through the same, it will be observed that the main straps serve to keep the housing in its proper shape.

While I prefer to use the intermediate button-holes, F F, secured in position in the manner shown and described, yet the cords E E may have two button-holes at one end and one at the other, and where it is desired to connect the suspenders to the pantaloons at only four points the intermediate button-holes, F, may be omitted.

By this construction and arrangement the greatest freedom of motion is allowed the wearer without undue strain upon the straps and cords or buttons, although the straps and cords used are non-elastic, for the reason that the cords are perfectly free to render through the pulleys and adapt themselves to the changed positions of the wearer.

I am aware that suspender-ends have been provided with button-holes by securing scrap buckskin, leather, &c., to the suspender-end proper by a metallic clasp; and I am also aware that in lieu of forming the button-hole from scrap buckskin, leather, &c., cord has been used to form the button-hole by securing the two ends thereof to the suspender-end with a metallic clasp, and I do not wish to be understood as laying claim to any such construction.

What I claim as new, and desire to secure by Letters Patent, is—

1. The improved brace or suspenders, consisting of two shoulder-straps, A A′, provided at their front and back ends with metallic housings and pulleys, in combination with two independent cords, E E, provided at each end with button-holes, the cords E being arranged to render through the front and rear pulleys, respectively, of each of the straps A A′, substantially as and for the purpose set forth.

2. In combination with the main straps A A′ and the two independent cords E E, arranged as described, the intermediate and independent button-holes, F, secured to the cords E in the manner described, and for the purposes set forth.

3. The sheet-metal housings C, formed at each end with loops H H, perforated at *a a*, and swelled or enlarged around said perforations, whereby the pulleys may be secured and concealed and the housing secured to the straps, substantially as and for the purpose set forth.

4. As a new article of manufacture, a suspender-end formed from a single cord, the end thereof being returned upon itself and fastened in position to form a button-hole, substantially as hereinbefore set forth.

THOMAS O. POTTER.

In presence of—
SAML. B. NOYES,
CHAS. P. COFFIN.